United States Patent
Decker

[15] 3,702,082
[45] Nov. 7, 1972

[54] BALANCING DEVICE FOR ROTATING MEMBERS

[72] Inventor: Jacob Decker, Cincinnati, Ohio

[73] Assignee: Cincinnati Milacron Inc., Cincinnati, Ohio

[22] Filed: Nov. 13, 1969

[21] Appl. No.: 876,308

[52] U.S. Cl. .................................. 74/573, 51/169
[51] Int. Cl. ............................................. F16f 15/00
[58] Field of Search ..................... 74/573; 51/169

[56] References Cited

UNITED STATES PATENTS 2,241,637   5/1941   Ernst et al. .............. 51/169 X

FOREIGN PATENTS OR APPLICATIONS 1,106,901   3/1968   Great Britain ............... 51/169

Primary Examiner—William F. O'Dea
Assistant Examiner—F. D. Shoemaker
Attorney—Howard T. Keiser and Alfred J. Mangels

[57] ABSTRACT

A device for balancing rotating members positioned on a rotatable shaft or spindle. A pair of movable balance weights are positioned within the shaft or spindle and are movable both with respect to each other and in unison about the axis of rotation of the rotating mass. The device includes means for moving the balance weights while the structure within which they are housed is rotating.

10 Claims, 7 Drawing Figures

INVENTOR.
JACOB DECKER
ATTORNEYS

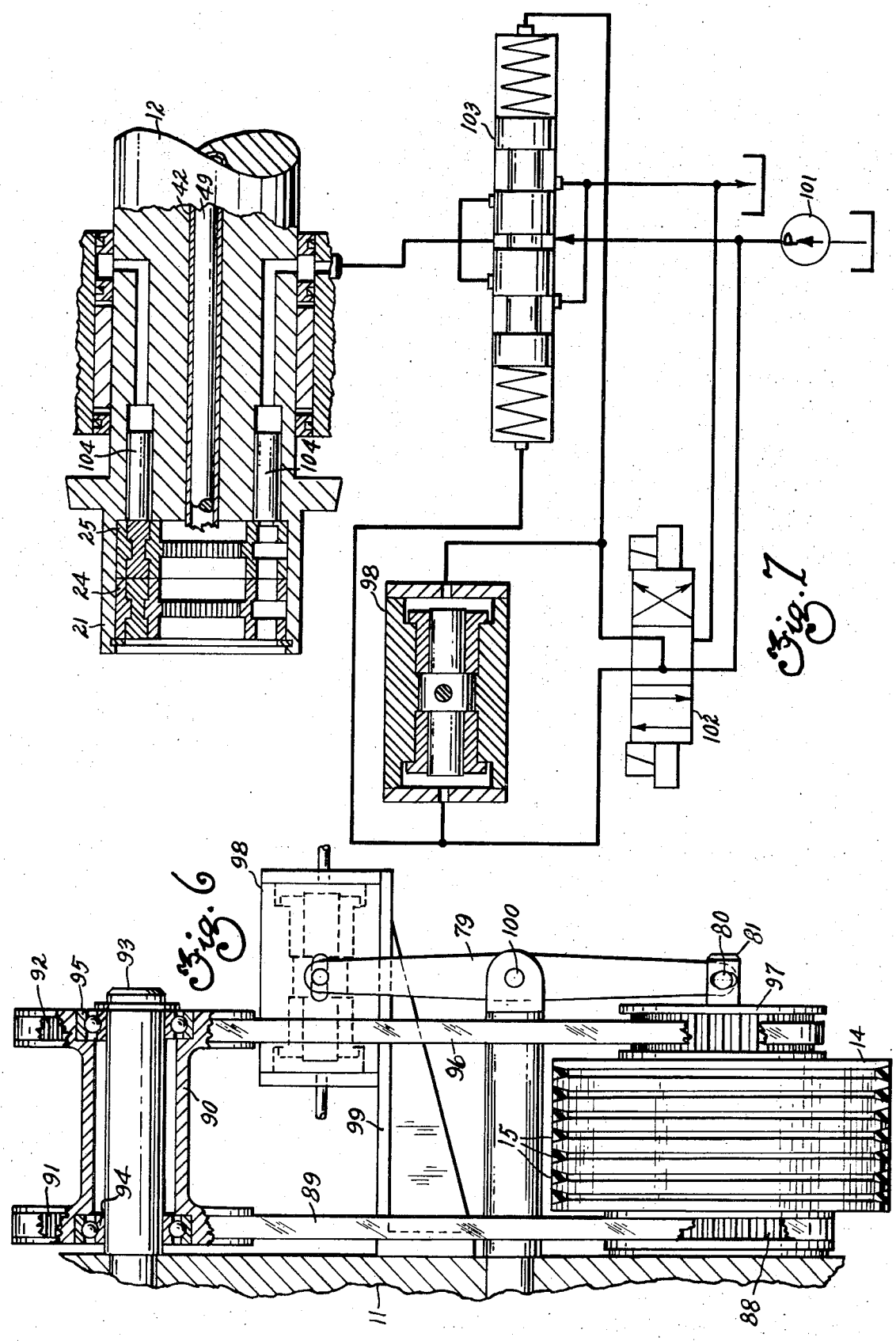

BALANCING DEVICE FOR ROTATING MEMBERS

BACKGROUND OF THE INVENTION

This invention relates to a device for balancing rotating masses. More particularly, the invention relates to a balancing device wherein a pair of balance weights positioned within a rotating shaft or spindle are movable relative to the rotating shaft and relative to each other to bring the rotating mass into rotational balance.

In the field of rotating machinery the need for keeping the rotating elements in balance is well-known to those skilled in the art. The effects of unbalance can include: excessive bearing wear, excessive noise, and, in the case of metalworking machinery, unbalance can result in vibrations which contribute to non-uniform and unacceptable surface finishes.

To overcome those problems and provide means for balancing rotating members, numerous devices have been proposed. MOst of the proposed devices have contemplated automatically sensing unbalance and compensating for it by moving balance weights to the required position to bring the rotating mass into rotational balance once again. Such automatic devices are generally quite complex from a mechanical standpoint, and thus are costly items which can usually only be justified on very expensive machinery. Therefore, a balancing device which is relatively simple, which can be manually operated, which can be economically produced, and which can provide the balancing function necessary is highly desirable.

Additionally, some balancing systems utilize a number of weights such as steel balls, which are released when unbalance is detected and which balance the systems by virtue of centrifugal forces acting on the weights to reposition them and thereby bring the rotating system into rotational equilibrium. However, the foregoing approach to balancing requires that the rotating system be relatively loosely supported during the balancing operation rather than rigidly supported and thus the spindle-bearing assembly is unclamped so that the steel balls can assume a position that offsets the unbalance in the system. After balancing, the assembly is clamped once again so that the balls are firmly held in the position they assumed to balance the system.

It is an object of the present invention to provide a relatively inexpensive yet effective balancing device which, although generally intended for manual operation, can be adapted for automatic operation if desired.

SUMMARY OF THE INVENTION

Briefly stated, in accordance with one aspect of the present invention, a balancing device is provided for use with rotating members which can be positioned on a rotatable shaft or spindle. The device is adapted to balance the rotating member while the same is rotating to thereby provide a quick and accurate means for balancing such a rotating member. The device includes a pair of movable balance weights positioned within the shaft or spindle so that each of the weights has its center of gravity radially spaced from the axis of rotation of the shaft or spindle. Means are provided for moving the balance weights relative to each other about the axis of rotation and also for moving of the weights in unison about the axis of rotation. The relative and unison motions of the balance weights are independently controllable to provide accurate means for balancing the rotating member.

BRIEF DESCRIPTION OF THE DRAWINGS

FIG. 6 is fragmentary view, partially in section, showing the spindle drive means and the system for initiating and maintaining the movement of the balance weights.

FIG. 7 is a schematic diagram showing one means for actuating the balance weight moving system and for locking the balance weights in position after the rotating mass has been balanced.

DESCRIPTION OF THE PREFERRED EMBODIMENT

Figure 1:
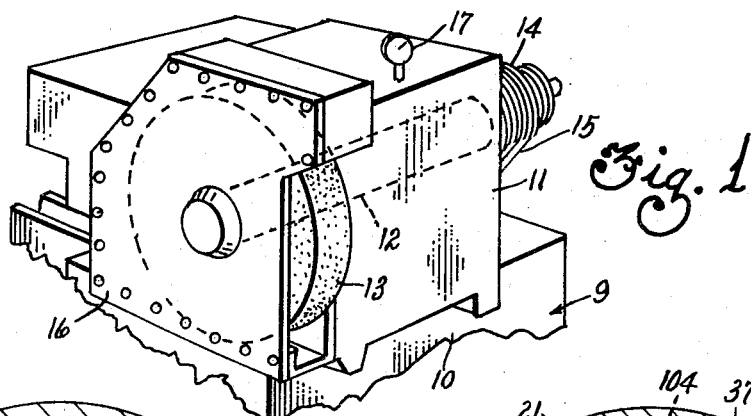
FIG. 1 is a fragmentary perspective view of a portion of a grinding machine incorporating the device constituting the present invention.

Referring now to the drawings, and particularly to FIG. 1 thereof, there is shown a grinding machine 9 comprising a base 10 upon which a spindle support 11 is slidably mounted. Spindle support 11 rotatably carries spindle 12 upon which a grinding wheel 13 is mounted. Spindle 12 is rotated by means of a motor (not shown) which drives the spindle through a pulley 14 by means of V-belts 15. A wheel guard 16 is positioned over a portion of grinding wheel 13 for safety purposes. Additionally, a vibration amplitude indicating device 17 can be attached to spindle support 11 to provide a direct visual indication of the amplitude of the vibrations and thereby facilitate the balancing operation. Although herein described in terms of its applications to a grinding wheel forming a part of a grinding machine, in which application the device of the present invention has been found to be particularly suitable, it should be understood that the balancing device comprising the present invention is not limited in its application to grinding machines but can, if desired, be utilized in other rotating apparatus wherein a balancing device is either necessary or desirable.

Figure 2:
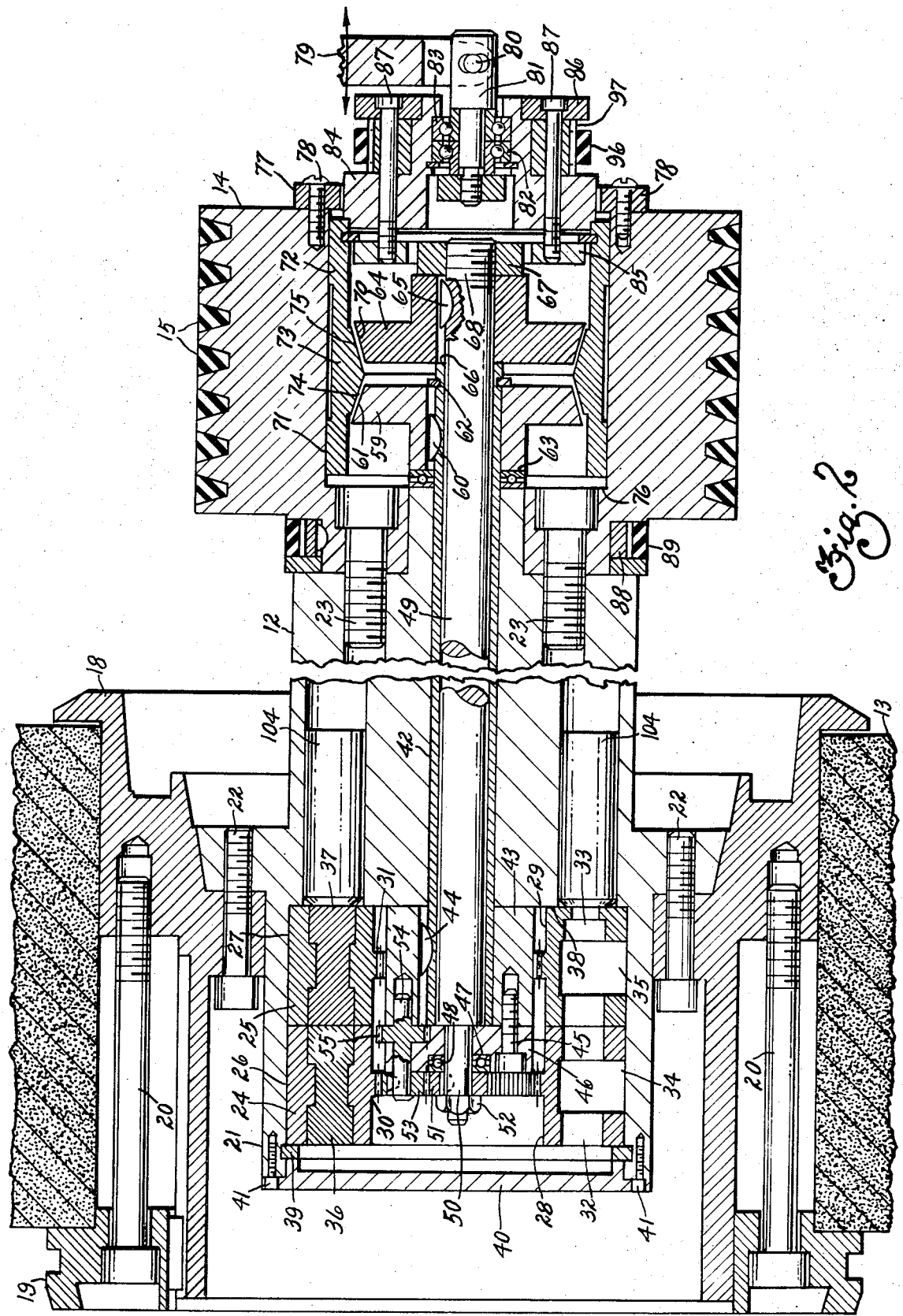
FIG. 2 is a longitudinal cross section through the spindle of the grinding machine of FIG. 1, with a portion of the spindle broken away, showing the arrangement of the spindle driving means and the positioning and overall structure of the balancing device.

As shown more clearly in FIG. 2, grinding wheel 13 is positioned on an annular, flanged wheel-carrying member 18 and is firmly positioned thereon by means of a retaining disc 19 which can be secured to the wheel mount as, for example, by means of bolts 20. Wheel-carrying member 18 is attached to spindle 12 in overlying concentric relationship to a hub portion 21, which connection can be made by means of bolts 22, for example. Pulley 14 is affixed to spindle 12 at the end of the spindle opposite hub portion 21 as for example, by means of bolts 23.

Figure 3:
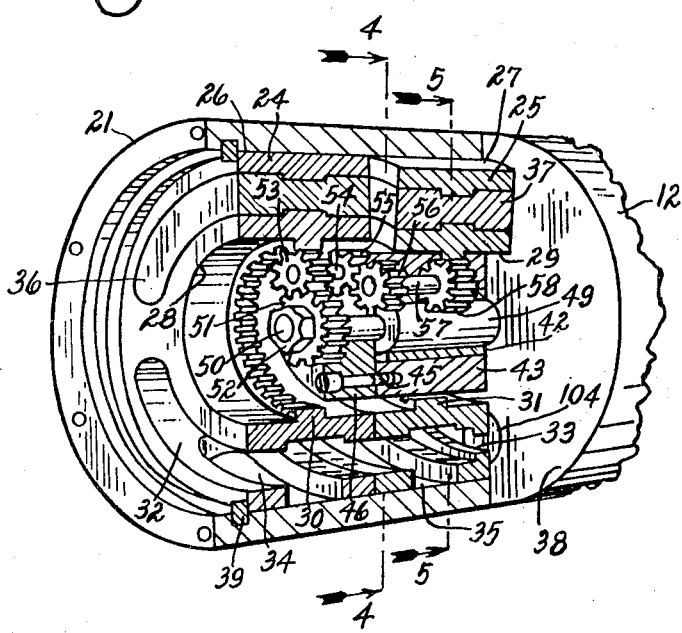
FIG. 3 is a fragmentary perspective view, partially in section, of the portion of the spindle within which the balancing device of the present invention is housed.

Hub portion 21 of spindle 12 constitutes the housing for a pair of movable weights 24, 25, respectively, by means of which grinding wheel 13 and its associated rotating supporting members are brought into balance. Weights 24, 25 are similarly configured and, as shown in FIG. 3, they comprise a generally annular structure having outer surfaces 26, 27 which can be rotated within hub portion 21, and inner surfaces 28, 29 which carry internal gears 30, 31, respectively, the function of which will be hereinafter explained in greater detail.

A portion of the material of which weights 24, 25 are made is removed on one side thereof to provide an unbalance in the weight. The unbalance is necessary in order to permit the weights to function as counter weights and thus off-set any unbalance in the rotating mass. In the configuration shown, arc-like slots 32, 33 have been formed in weights 24, 25, respectively and extend through approximately 180° arc. Additionally, radial slots 34, 35 have been formed in the same portions in which the arc-like slots 32, 33, respectively were formed in order to further reduce the mass on one side of the balance weights. If desired, additional arc-like slots 36, 37 can be formed in balance weights 24, 25 respectively, and filled with a heavier material such as, for example, lead. In any event, the mass of each of the balance weights and the location of its center of gravity with respect to the axis of rotation are determined by the extent of unbalance anticipated in the rotating structure. The greater the distance of the center of gravity of each of the weights from the axis of rotation, the greater will be the unbalance of the weights and thus the wider the range of unbalance of the rotating mass which can be corrected by the present invention.

Referring once again to FIG. 2, weights 24, 25 are positioned within hub 21 in such a fashion that they can be readily rotated therein relative to the inner surface of the hub to cause the hub to become unbalanced. Weight 25 is positioned against a stop 38 and weight 24 is positioned adjacent weight 25 and is held in position by means of a retaining ring 39. A cover 40 can then be applied to hub 21, if desired, and secured thereto as, for example, by means of bolts 41. As previously mentioned, each of weights 24, 25 carries internal gears 30, 31, respectively. Those gears are adapted to be driven by a gear train connected to means to move the weights relative to one another or in unison relative to the axis of rotation.

A hollow drive shaft 42 is co-axially and rotatably positioned within spindle 12 and extends into hub 21 in which weights 24, 25 are positioned. Shaft 42 carries a gear retainer 43 which can be keyed thereto as by means of the key 44 shown in FIG. 2. Attached to gear retainer 43 as, for example, by means of bolts 45 is a bearing retainer 46 which includes a circular recess 47 to receive a thrust bearing 48. Positioned within hollow shaft 42 and rotatable with respect thereto is a solid drive shaft 49, which also extends into hub 21 in which weights 24, 25 are housed. Solid shaft 49 has an end portion 50 of reduced cross-section which passes through bearing retainer 46 and carries keyed to it a pinion 51, which is secured in position between the outer race of thrust bearing 48 and a securing nut 52 attached to threads formed on end portion 50.

Referring now to FIG. 3, pinion 51 mates with an idler gear 53 which, in turn, meshes with internal gear 30 on weight 24. Thus, by rotating solid shaft 49, and thus pinion 51 attached thereto, weight 24 is caused to rotate within hub portion 21. Idler gear 53 is mounted on a shaft 54 which passes through bearing retainer 46 and which fixedly carries at its opposite end a gear 55 which meshes with and drives another gear 56, which is mounted on a shaft 57 carried in gear retainer 43 and to which is attached a driving gear 58, which meshes with and drives internal gear 31 formed on the innermost surface of weight 25.

Figure 4:
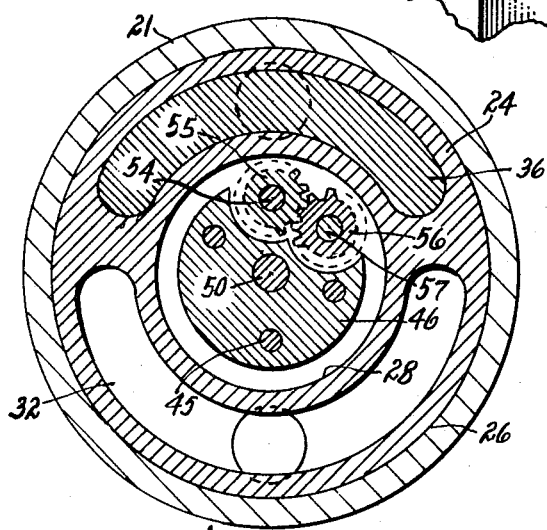
FIG. 4 is a cross-sectional view of the spindle taken along the line 4—4 of FIG. 3 and shows a portion of the gear train system for moving the balance weights.
Figure 5:
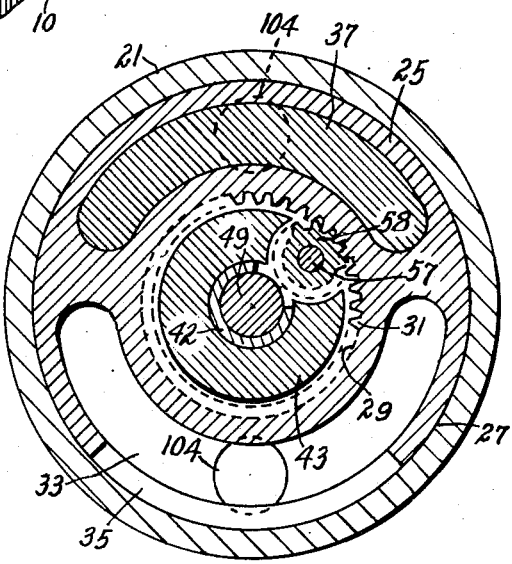
FIG. 5 is a cross-sectional view of the spindle taken along the line 5—5 of FIG. 3 and shows the driving means for moving one of the balance weights.

The arrangement of the gear train hereinabove described is shown more clearly in FIGS. 4 and 5. FIG. 4 is a transverse cross section taken through the gears 55, 56 and showing the relationship of those gears with bearing retainer 46. Similarly, FIG. 5 is a transverse cross section through driving gear 58 showing its relationship with gear retainer 43 and internal gear 31. Although shown and described in terms of a gear train comprising five gears, it would be apparent to those skilled in the art that various other gearing arrangements could be employed to provide similar results. For example, idler gear 53 and gear 55 could be replaced by a single gear having a width which equals the distance between the outermost faces of those gears. Similarly, with respect to gear 56 and driving gear 58, a similar elongated gear having a width substantially equal to the distance between the outermost faces of the gears 56 and 58 could also be employed.

It can thus be seen that by rotating solid shaft 49 pinion 51 engages idler gear 53 which, in turn, causes the weight 24 to rotate within hub 21. Similarly, gear 55, attached to shaft 54 on which idler gear 53 is carried, drives gear 56 which, in turn, rotates shaft 57 on which driving gear 58 is positioned. The latter meshes with and drives internal gear 31 on the weight 25. Thus, by rotating solid shaft 49, weights 24, 25 are caused to rotate about the axis of rotation of spindle 12 and simultaneously to move relative to each other. On the other hand, when hollow shaft 42 is rotated, the gear train is in a locked condition and, as a result, weights 24, 25 rotate in unison about the axis of rotation of spindle 12.

Referring once again to FIG. 2, hollow shaft 42 carries a clutch member 59, as by means of a key 60. Clutch member 59 has a pressure face 61 and is held in position by a retaining ring 62 at its outermost end. The rear face of clutch member 59 abuts the outer race of thrust bearing 63, which is adapted to absorb the axial thrust imposed upon hollow shaft 42 when clutch member 59 is driven.

Solid drive shaft 49 also carries a clutch member 64 affixed to its outermost end and secured for rotation with shaft 49 by means of a key 65. Clutch member 64 is axially positioned on solid shaft 49 between end 66 of hollow drive shaft 42 and nut 67 applied to threaded portion 68 of solid drive shaft 49. Each of clutch members 59, 64 has a generally frusto-conical pressure face 61, 70, respectively, which are oppositely positioned.

Clutch members 59, 64 are housed within a cylindrical recess 71 in pulley 14 within which an annular driving member 72 is also positioned. Annular driving member 72 has a V-shaped central portion 73 formed by oblique pressure faces 74, 75 respectively, and is adapted to be positioned intermediate the clutch members 59, 64. Pressure faces 74, 75 are opposite frustoconical clutch member pressure faces 61, 70, respectively. In one direction the axial movement of annular driving member 72 is restrained by the inner face 76 of pulley 14 and in the other direction by means of an annular restraining ring 77, which is attached to pulley 14 by means of bolts 78. Annular driving member 72 is both rotatable about the axis of rotation of spindle 12 and is axially translatable therealong a limited distance. It can thus be seen that when annular driving member 72 is axially translated with respect to spindle 12, it can contact either of pressure faces 61, 70 of clutch members 59, 64, respectively.

Axial movement of annular driving member 72 is imparted through a lever 79 which is pinned by means of pin 80 to a supporting shaft 81 journalled within a pair of bearings 82, 83 that are carried by a bearing housing 84 which, in turn, is secured to annular driving member 72 by means of annular end rings 85, 86 and bolts 87. Thus, when lever 79 is caused to move outwardly, or to the right as viewed in FIG. 2, and annular driving member 72 is rotated in a manner to be hereinafter explained, pressure face 75 of annular driving member 72 contacts and thus rotates pressure face 70 of clutch member 64 keyed to solid shaft 49 which, in turn, drives the gear train and causes the weights to move relative to each other. Conversely, when lever 79 moves inwardly or to the left as viewed in FIG. 2, pressure face 74 of annular driving member 72 contacts pressure face 61 of clutch member 59 keyed to hollow shaft 42 and, because of the inter-connection between the gears, as hereinbefore pointed out, the two weights move in unison about the axis of rotation of spindle 12.

As best seen in FIGS. 2 and 6, annular driving member 72 is driven through a positive drive system, such as, for example, a timing belt and toothed pulley. A toothed pulley 88 is provided at one end of pulley 14 adjacent to spindle 12 and by means of a timing belt 89 drives a dual pulley 90 (FIG. 6) having two toothed grooves 91, 92, and which is rotatably supported on a shaft 93 by means of bearings 94, 95. A timing belt 96 passes around groove 92 also passes around a toothed pulley 97, which is attached to bearing housing 84 and thereby causes the latter and thus annular driving member 72 to be rotated. Depending upon the sizes of the various pulleys and grooves 88, 91, 92 and 97, annular driving member 72 can be arranged to rotate at any desired speed. Preferably, however, those pulleys and grooves are so configured that annular driving member 72 rotates at a speed slightly greater than or slightly less than that of spindle 12. When the speed difference between annular driving member 72 and spindle 12 is kept small, the relative rotation between the spindle and weights will also be kept small and thus will permit more precise correction of unbalance by more accurately positioning the balancing weights both with respect to each other and with respect to spindle 12. The greater the speed differential between the too elements, the more quickly will the balance weights reach an equlibrium position, but, in addition, there is a greater liklihood of overshooting the balance point in that weights may not be stopped in their movement until after the balance point has been reached.

As is apparent from the foregoing, annular driving member 72, and thus also lever 79 have essentially three positions: an intermediate, or neutral position, and a right and left position, depending upon which of shafts 42, 49, is to be driven. Although lever 79 can be moved manually if desired, a preferred embodiment of the present invention includes hydraulic means for positioning annular driving member 72. As best seen in FIG. 6, a three-position valve 98 is secured to a plate 99 affixed to grinding machine 9 and is so arranged that in its neutral position lever 79 so positions annular driving member 72 that the latter also is in its neutral position. The distances from pin 80 to a fulcrum 100 to three-position valve 98 are so selected that when valve 98 is in one extreme of its path of travel annular driving member 72 engages one of the clutch elements and when the valve is at the other extreme end of its path of travel annular driving member 72 contacts the other clutch element.

A suitable hydraulic system for positioning annular driving member 72 is shown in FIG. 7. A pump 101 is utilized to feed hydraulic oil through a three-position, four-connection directional valve 102 operated by solonoids actuated by pushbuttons (not shown). When directional valve 102 is at a neutral position, hydraulic pressure is applied to each end of three-position valve 98 and the latter is thus also in a neutral position. When directional valve 102 is in one position, valve 98 causes the lever to move in one direction and then directional valve 102 is in the opposite extreme position the three-position valve also reverses itself and causes the lever to move in the opposite direction, thereby controlling the direction and amount of rotation of the balance weights.

Also forming a portion of the hydraulic circuit illustrated in FIG. 7 is a locking means for locking the balance weights in position after the rotating mass has been balanced. The system comprises directional valve 103 connected in parallel with valve 98 and which permits flow to a plurality of locking pistons 104 which bear against the outer face of weight 25 (see also FIG. 2). The system is so arranged that when three-position valve 98 which actuates lever 79, which, in turn, controls annular driving member 72, is in the neutral position, directional valve 103 is also in the neutral position, thereby permitting hydraulic pressure to bear against the locking pistons 104 which contact weight 25 and by virtue of the cooperation between locking pistons 104 and retaining ring 39, the weights are retained in any desired position relative to each other and also relative to hub 21. However, when three-position valve 98 is moved to either extreme of its path of travel to actuate lever 79, and thereby engage one of clutch members 59, 64, directional valve 104 is also moved to one side or the other thereby releasing the the pressure on the locking piston and permitting the balance weights to rotate.

Although described in terms of a mechanical drive system comprising various frictional clutches and pulleys, it would be apparent to one skilled in the art that other driving means can be utilized and still provide the benefits of this invention. For example, the mechanical clutches can be replaced by electrical clutches and the hydraulic actuation system replaced by a suitable electrical system, if desired.

It can thus be seen that the present invention provides a compact, self-contained balancing device which is capable of either completely manual operation or which can be hydraulically actuated at the signal of a machine operator. It is also apparent that the device disclosed in the present application is also suseptible of automatic control provided an element for sensing unbalance and suitable automatic control functions are incorporated therein.

While particular embodiments of the invention have been illustrated and described, it will be apparent to those skilled in the art that various changes and modifications can be made without departing from the spirit and scope of the invention, and it is intended to cover in the appended claims all such changes and modifications that are within the scope of this invention.

What is claimed is:

1. A balancing device for balancing a rotating member positioned on a rotatable spindle while the same is rotating about its axis of rotation, said device comprising:
   a. a pair of movable balance weights positioned within said spindle, said weights having their respective centers of gravity radially spaced from the axis of rotation of said spindle and axially spaced from each other, each of said movable weights being of generally annular configuration and having internal gear teeth on its innermost surface;
   b. first weight moving means for moving said balance weights relative to each other and about said axis of rotation;
   c. second weight moving means for moving said balance weights in unison about said spindle axis; and
   d. means for selectively engaging said first or said second weight moving means whereby substantially to bring said rotating mass into balance.

2. The device of claim 1 wherein said first weight moving means and said second weight moving means comprise gear means meshing with said internal gear teeth to cause said balance weights to move relative to each other when said first weight moving means is activated and to cause said balance weights to move in unison about said axis of rotation when said second weight moving means is activated.

3. The device of claim 2 wherein said first weight moving means and said second weight moving means are independently driven by separate clutch means connected to said gear means.

4. The device of claim 3 including power input means for selectively imparting rotational motion to each of said clutch means to thereby move said balance weights and substantially balance said rotating member.

5. The device of claim 4 wherein said power input means comprises a clutch driving member driven by said spindle at a predetermined speed different from that of said spindle, said clutch driving member being selectively engageable with each of said clutch means.

6. The device of claim 5 including means for locking said movable weights in any desired position relative to said spindle.

7. The device of claim 6 wherein said locking means comprises axial force means for imposing an axial force on said balance weights to frictionally position them with respect to said spindle.

8. The device of claim 7 wherein said axial force means comprises at least one hydraulically actuated piston which bears against one of said balance weights.

9. The device of claim 7 wherein said locking means and said power input means are so coupled that upon actuating said weight moving means said locking means is in non-locking position, and when said weight moving means is not actuated said locking means is in locking position.

10. The device of claim 9 including means for sensing rotational unbalance of said spindle.

* * * * *